United States Patent
Anderson et al.

(10) Patent No.: US 11,818,977 B2
(45) Date of Patent: Nov. 21, 2023

(54) SYSTEM AND METHOD FOR INTERCROP PLANTING

(71) Applicant: DEERE & COMPANY, Moline, IL (US)

(72) Inventors: Noel W. Anderson, Fargo, ND (US); Mark E. Barker, Johnston, IA (US)

(73) Assignee: Deere & Company, Moline, IL (US)

( * ) Notice: Subject to any disclaimer, the term of this patent is extended or adjusted under 35 U.S.C. 154(b) by 279 days.

(21) Appl. No.: 17/107,041

(22) Filed: Nov. 30, 2020

(65) Prior Publication Data
US 2022/0167551 A1   Jun. 2, 2022

(51) Int. Cl.
| | |
|---|---|
| *A01C 21/00* | (2006.01) |
| *G01C 21/00* | (2006.01) |
| *A01C 5/04* | (2006.01) |
| *A01C 7/08* | (2006.01) |
| *G05D 1/02* | (2020.01) |

(52) U.S. Cl.
CPC .............. *A01C 21/005* (2013.01); *A01C 5/04* (2013.01); *A01C 7/081* (2013.01); *G01C 21/3807* (2020.08); *G05D 1/0219* (2013.01)

(58) Field of Classification Search
CPC ......... A01C 21/005; A01C 5/04; A01C 7/081; G05D 1/0219; G06Q 10/043; G06Q 50/02
USPC .................................... 111/903, 923; 701/50
See application file for complete search history.

(56) References Cited

U.S. PATENT DOCUMENTS

| | | | |
|---|---|---|---|
| 4,444,130 | A | 4/1984 | Ray |
| 8,863,676 | B2 | 10/2014 | Brockmann et al. |
| 8,942,894 | B2 * | 1/2015 | Garner .................. A01C 21/005 |
| | | | 701/50 |

(Continued)

FOREIGN PATENT DOCUMENTS

| | | |
|---|---|---|
| CN | 105165188 A | 12/2015 |
| CN | 108566801 A | 9/2018 |

(Continued)

OTHER PUBLICATIONS

German Search Report issued in application No. DE102021211505.5 dated May 24, 2022 (10 pages).

(Continued)

*Primary Examiner* — Donald J Wallace
*Assistant Examiner* — Jalal C Coduroglu
(74) *Attorney, Agent, or Firm* — Michael Best & Friedrich LLP

(57) ABSTRACT

A field planting system for planting seeds of at least two plant genotypes in a field includes a multi-variety planter operable to plant the seeds of the at least two plant genotypes in the field. The field planting system also includes a controller in operable communication with the multi-variety planter. The controller is configured to receive georeferenced field information for the field and plant information for the at least two plant genotypes, and generate a planting map for the field based on the georeferenced field information and the plant information, the planting map including a planting pattern for interplanting the seeds of the at least two plant genotypes. The controller is further configured to monitor a location of the multi-variety planter in the field, and control the multi-variety planter to plant the seeds of the at least two plant genotypes in the field according to the planting map.

20 Claims, 11 Drawing Sheets

(56) References Cited

U.S. PATENT DOCUMENTS

| | | | |
|---|---|---|---|
| 9,282,693 B2* | 3/2016 | Anderson | A01B 79/005 |
| 9,596,803 B2* | 3/2017 | Wendte | A01B 79/005 |
| 9,730,379 B2* | 8/2017 | Wendte | A01C 7/20 |
| 10,524,410 B2 | 1/2020 | Schoeny et al. | |
| 10,542,666 B2* | 1/2020 | Connell | B62D 11/20 |
| 10,709,059 B2* | 7/2020 | Wendte | A01C 7/105 |
| 11,291,172 B2* | 4/2022 | Beeri | A01G 25/165 |
| 2013/0145498 A1* | 6/2013 | Dickstein | C12N 15/8261 800/290 |
| 2014/0165889 A1* | 6/2014 | Garner | A01C 7/046 111/130 |
| 2015/0334914 A1* | 11/2015 | Zielke | A01B 27/00 701/50 |
| 2016/0007523 A1 | 1/2016 | Rylander | |
| 2016/0088786 A1 | 3/2016 | Kornecki et al. | |
| 2016/0234996 A1* | 8/2016 | Sauder | A01C 21/005 |
| 2017/0172057 A1 | 6/2017 | Rylander | |
| 2017/0202132 A1* | 7/2017 | Maust | A01C 5/06 |
| 2018/0124998 A1 | 5/2018 | Swanson et al. | |
| 2019/0230845 A1 | 8/2019 | Buchner et al. | |
| 2020/0128724 A1 | 4/2020 | Stoller et al. | |
| 2022/0111960 A1* | 4/2022 | Tran | B64U 10/13 |
| 2022/0167551 A1* | 6/2022 | Anderson | A01C 7/081 |

FOREIGN PATENT DOCUMENTS

| | | | |
|---|---|---|---|
| CN | 208370186 U | 1/2019 | |
| CN | 110859073 A | 3/2020 | |
| DE | 102019218191 A1 * | 5/2021 | A01C 21/005 |
| DE | 102019218191 A1 | 5/2021 | |
| EP | 1780126 A1 | 5/2007 | |
| GB | 2527818 A * | 1/2016 | A01C 21/005 |
| WO | WO-2015048817 A1 * | 4/2015 | A01C 21/005 |

OTHER PUBLICATIONS

Bosch, "Rotary Capping Machines VRM 6000-7000-8000," <https://docplayer.net/43577517-Rotary-capping-machines-vrm.html> publicly available at least as early as Aug. 29, 2020 (6 pages).

Karmelle, "Rotary Capping Machine," <http://karmelle.com/products/capping-machines/rotary-capper/> publicly available at least as early as Aug. 29, 2020 (2 pages).

Saintyco, "Automatic Capping Machine: The Complete Guide," <https://www.saintytec.com/automatic-capping-machine/> publicly available at least as early as Aug. 29, 2020 (39 pages).

Moore, "The History of Dibbling," <https://www.farmcollector.com/looking-back/history-dibbling-zb0z1804zhur> web page publicly available at least as early as Apr. 5, 2018.

Bybee-Finley et al., "Advancing Intercropping Research and Practices in Industrialized Agricultural Landscapes," Agriculture, 2018, vol. 8, pp. 1-24.

Morrone et al., "From Soil Problems to Progress: Advanced Cover Crops Systems Planning," <https://www.canr.msu.edu/foodsystems/uploads/files/advanced-cover-crops-systems-planning.pdf> PowerPoint publicly available at east as early as Aug. 18, 2020 (29 pages).

* cited by examiner

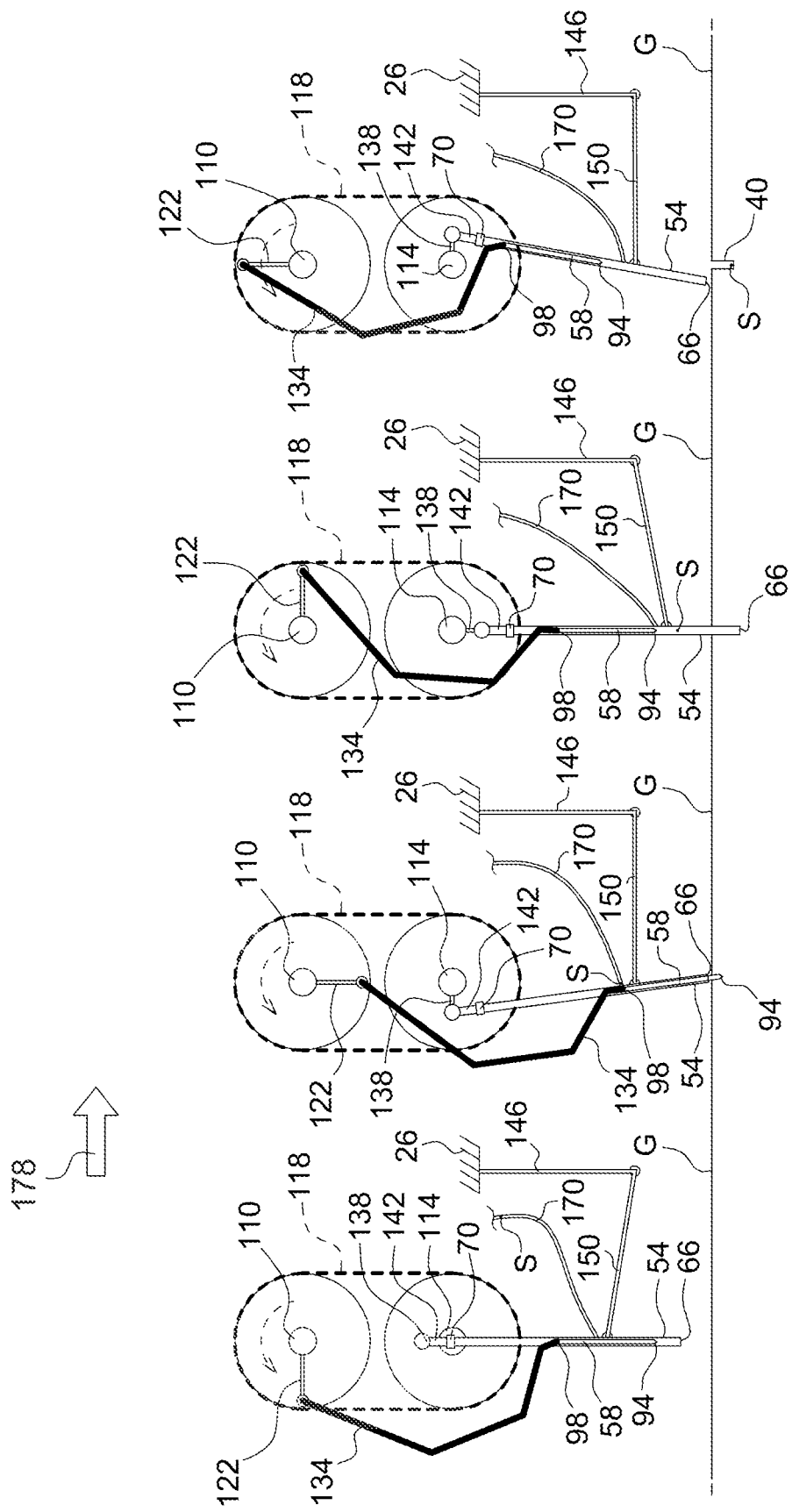

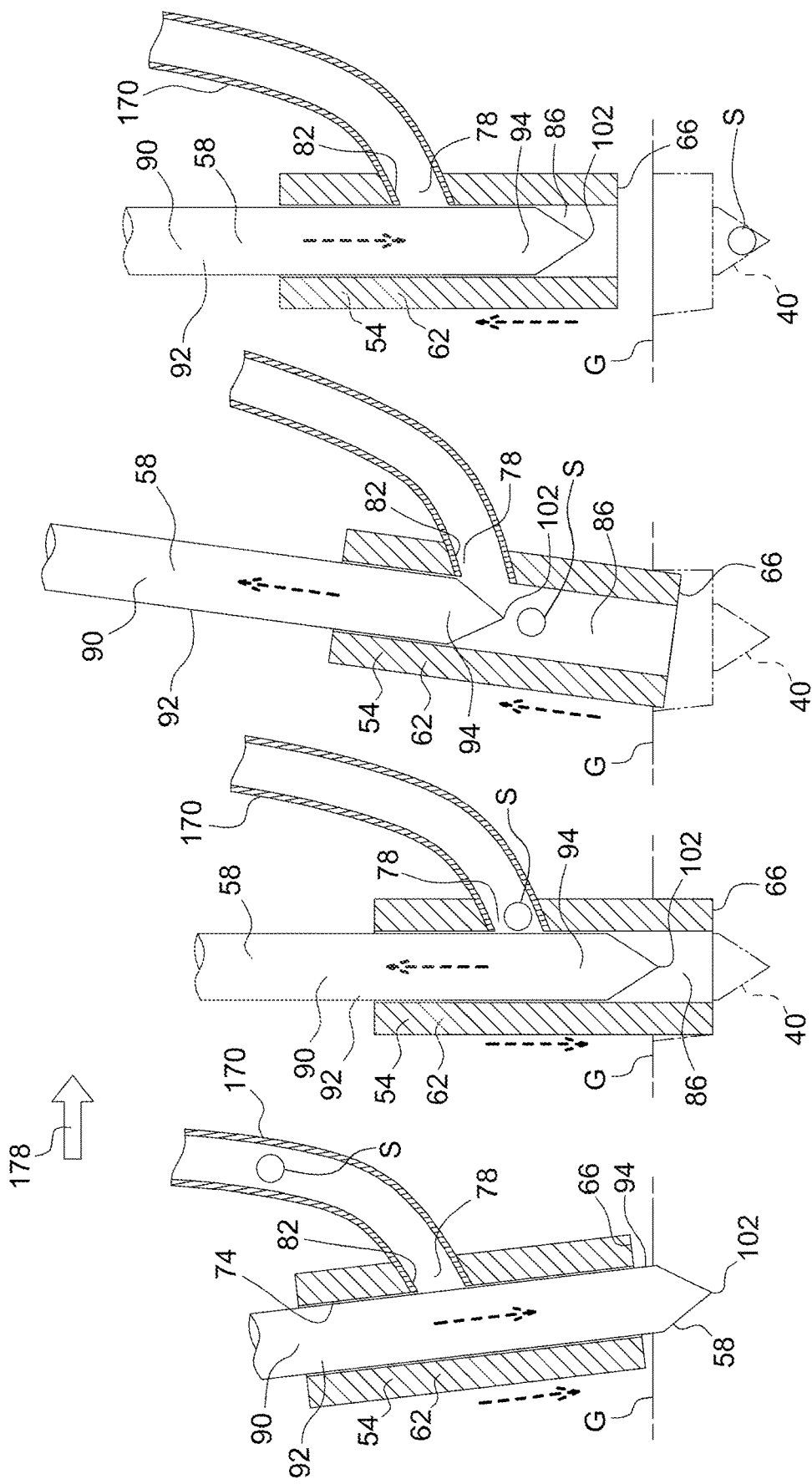

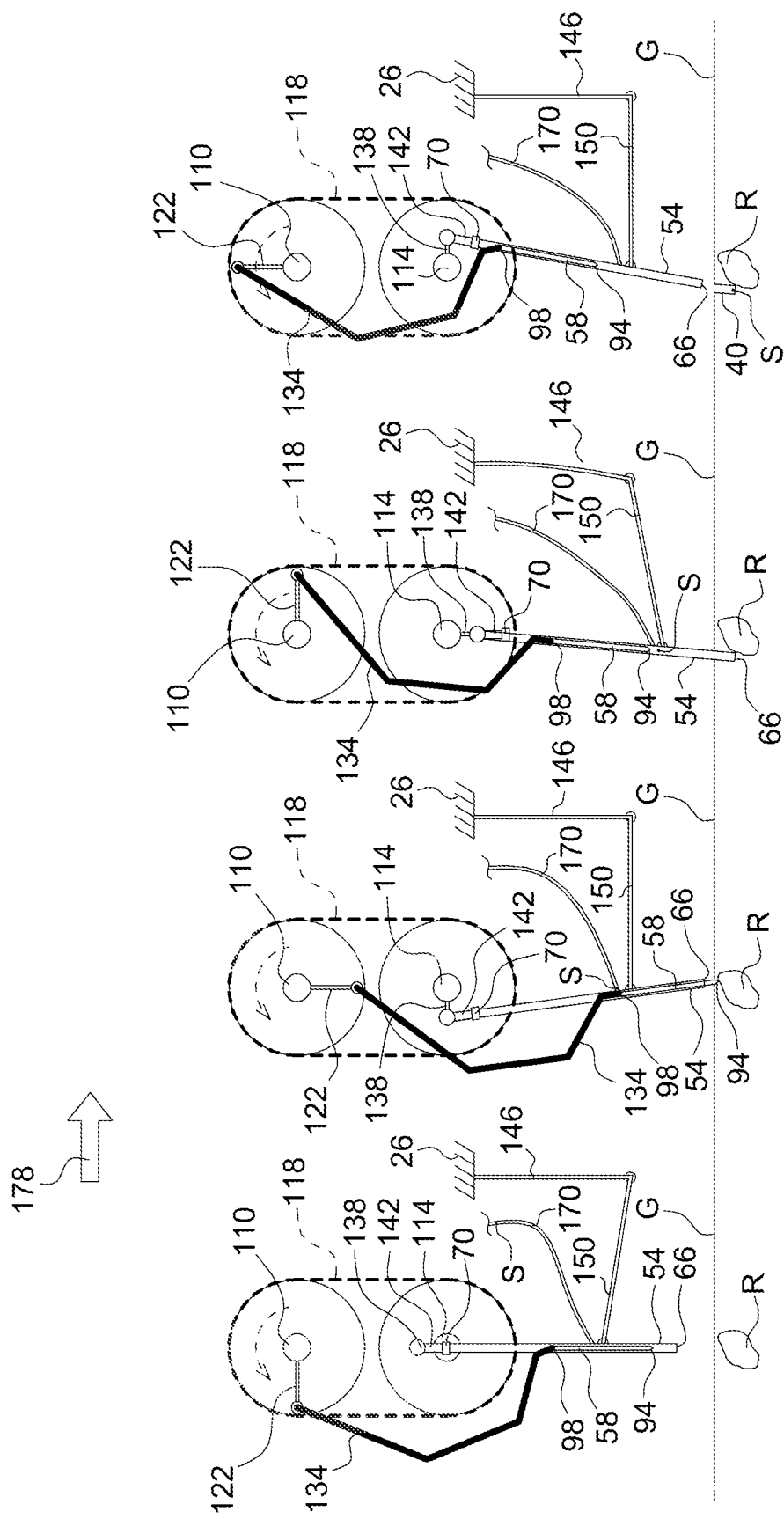

SYSTEM AND METHOD FOR INTERCROP PLANTING

FIELD

The present disclosure relates to a seeding machine having a seed delivery system for delivering seed from a hopper to the ground, and to systems and methods for simultaneously planting seeds of two or more different plant genotypes in a single planting operation via the seeding machine.

BACKGROUND

An agricultural seeding machine such as a row crop planter typically forms a plurality of parallel seed trenches in the soil using a furrow opening disc and places seeds at a desired depth within the trenches. The furrow opening discs require a large amount of force to create the trenches especially when the machine is moving at high speeds and in more compacted soils. Additionally, the structure of the furrow opening discs is such that a large minimum distance is required between the rows.

The current practice for cocktail seeding is to use a seed mix with fixed ratio of the component seeds. This mix is planted at a single depth.

SUMMARY

In one aspect, the disclosure provides a field planting system for planting seeds of at least two plant genotypes in a field. The field planting system includes a multi-variety planter operable to plant the seeds of the at least two plant genotypes in the field, and a controller in operable communication with the multi-variety planter. The controller is configured to receive georeferenced field information for the field and plant information for the at least two plant genotypes. The controller is also configured to generate a planting map for the field based on the georeferenced field information and the plant information, the planting map including a planting pattern for interplanting the seeds of the at least two plant genotypes. The controller is further configured to monitor a location of the multi-variety planter in the field, and control the multi-variety planter to plant the seeds of the at least two plant genotypes in the field according to the planting map.

In another aspect, the disclosure provides a field planting system for planting seeds of a first plant genotype and seeds of a second plant genotype in a field. The field planting system includes a multi-variety planter operable to plant the seeds of the first and second plant genotypes in the field, and a controller in operable communication with the multi-variety planter. The controller is configured to receive georeferenced field information for the field and plant information for the first and second plant genotypes. The controller is also configured to sub-divide the field into a first region and a second region based at least in part on the georeferenced field information. The controller is further configured to generate a planting map for the field based on the georeferenced field information and the plant information. The planting map includes a first planting pattern for interplanting the seeds of the first and second plant genotypes in the first region, and a second planting pattern for interplanting the seeds of the first and second plant genotypes in the second region, the second planting pattern being different from the first planting pattern. The controller is further configured to monitor a location of the multi-variety planter in the field, and control the multi-variety planter to plant the seeds of the first and second plant genotypes in the field according to the planting map.

In another aspect, the disclosure provides a method of planting an intercrop in a field with a multi-variety planter. The method includes receiving georeferenced field information for the field and plant information for a first plant genotype and a second plant genotype. The method also includes generating a planting map for the field based on the georeferenced field information and the plant information, the planting map including a planting pattern for interplanting seeds of the first plant genotype and seeds of the second plant genotype in the field. The method further includes monitoring a location of the multi-variety planter in the field, and planting the seeds of the first and second plant genotypes in the field via the multi-variety planter and according to the planting map.

Other aspects of the disclosure will become apparent by consideration of the detailed description and accompanying drawings.

BRIEF DESCRIPTION OF THE DRAWINGS

FIGS. 3-6 are schematic side views of a portion of the row unit of FIG. 2 cycling through a series of positions.

FIGS. 7-10 are schematic side views of a planting assembly of the row unit of FIG. 2 cycling through a series of positions.

FIGS. 11-14 are schematic side views of a portion of the row unit of FIG. 2 cycling through a series of positions under alternate conditions.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting. The terms "up", "down", and the like may be used herein and should be understood to mean with respect to the ground.

Figure 1:
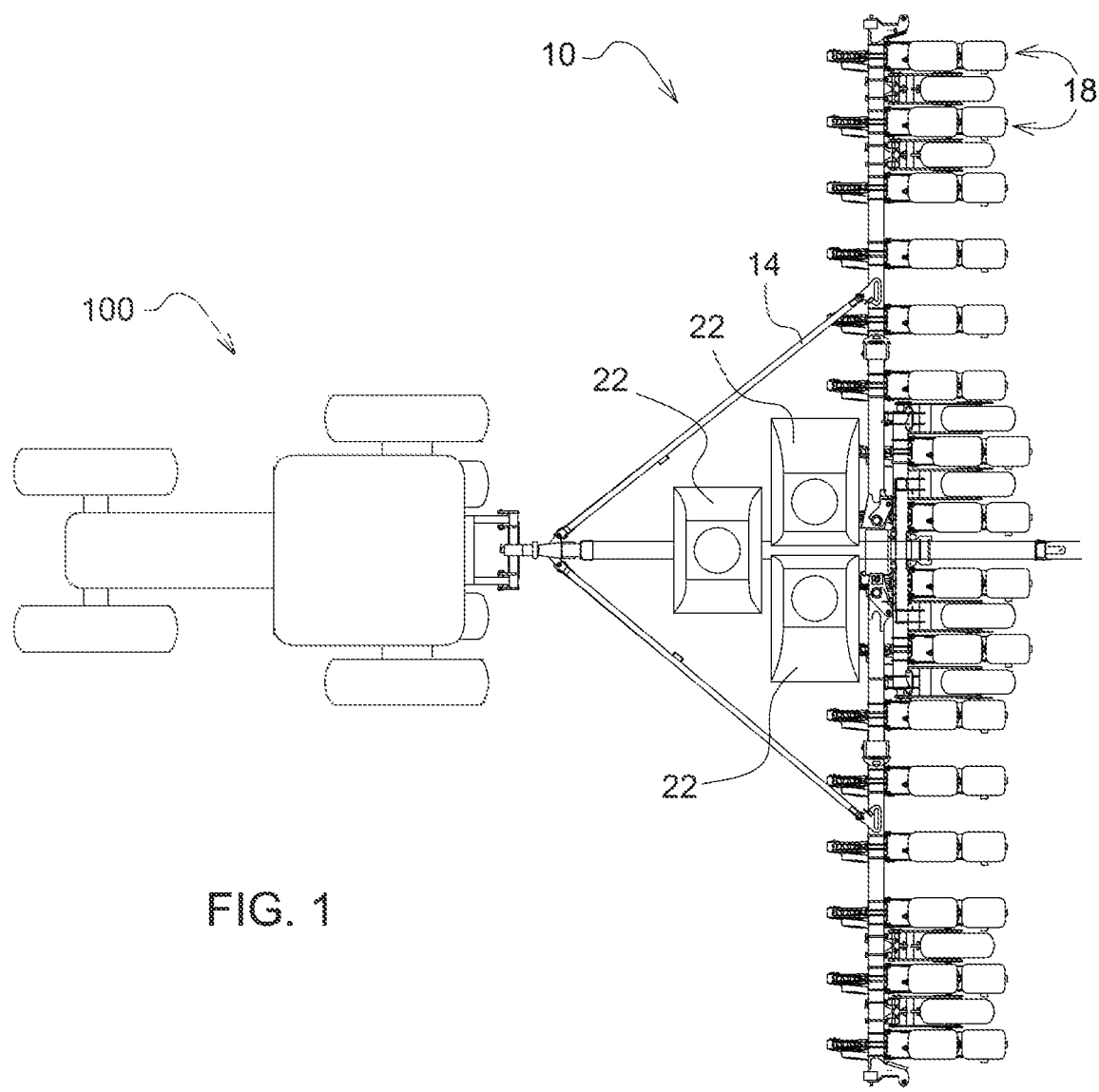
FIG. 1 is a top schematic view of a tractor and a planter having a plurality of row units.
Figure 2:
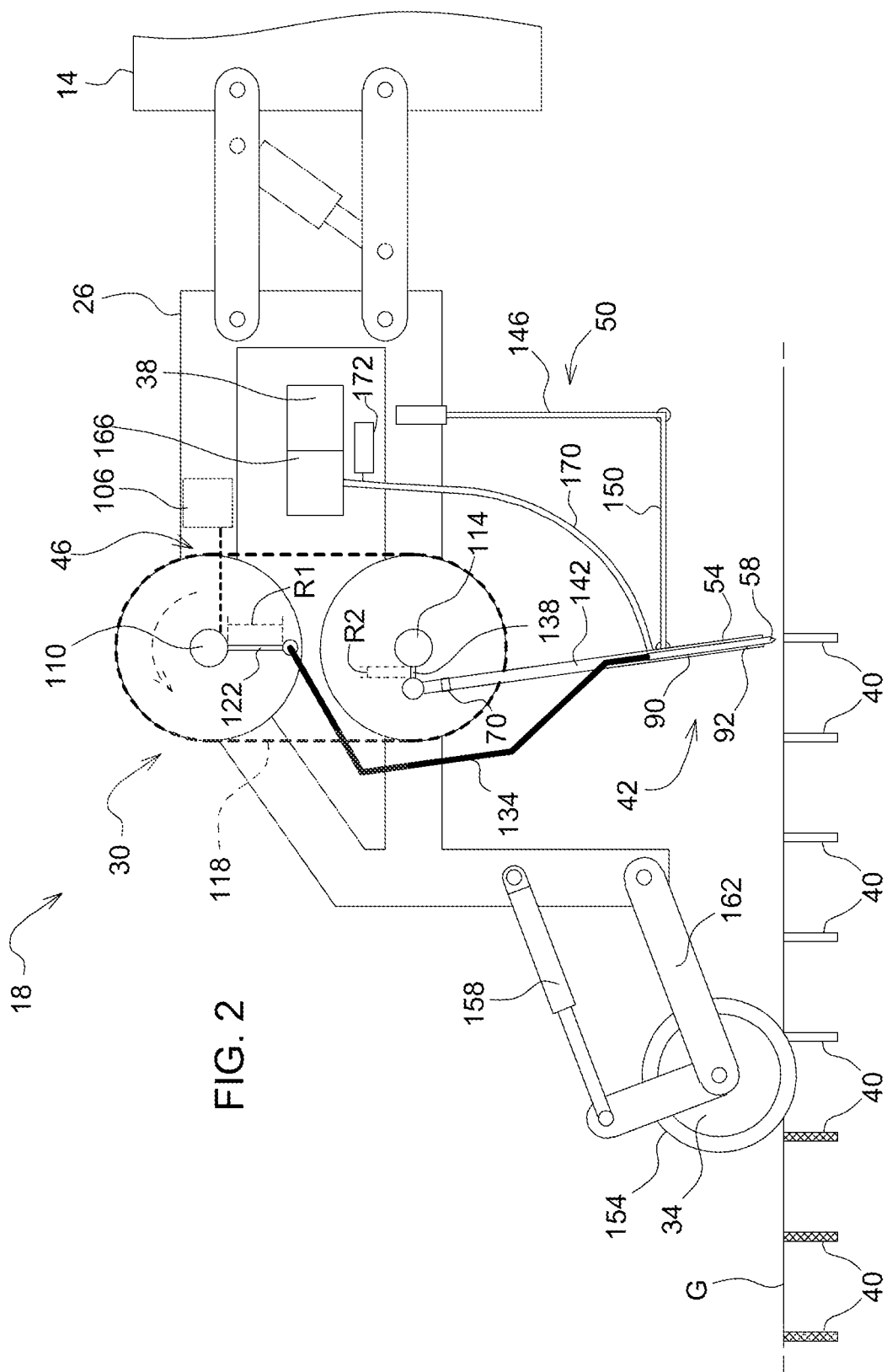
FIG. 2 is a side view of one of the plurality of row units of the planter of FIG. 1.

With reference to FIG. 1 a planter 10 (which may also be referred to as a seeding machine) is shown. The planter 10 is selectively coupled to a vehicle 100, such as a tractor, to be pulled across a ground G (FIG. 2). The planter 10 includes a planter frame 14. A plurality of planting row units 18 are mounted to the planter frame 14. Mounted to the planter frame 14 are one or more hoppers 22 containing seeds to be planted. In some implementations the seeds are all the same. In other implementations, the seeds may be different by hopper 22 and may be planted differently by row or by location within a row. In other examples without limitation, detachable planter frame 14 may be rigidly attached to a prime mover such as with a three point hitch of vehicle 100 or planter frame 14 may be permanently integrated with vehicle 100.

With reference to FIG. 2, one of the plurality of row units 18 is shown in greater detail and may be referred to herein as "the row unit 18". The plurality of row units 18 may be identical to each other in some implementations but may have some differences in other implementations. The row unit 18 is provided with a central frame member 26 supported on the planter frame 14 by downforce control actuators. The central frame member 26 is configured to support a seeding system 30, a press wheel 34, and a mini hopper 38. The seeding system 30 is operable to create a hole 40 in the ground G for receiving a seed S (FIG. 7) and to inject the seed into the space. The press wheel 34 then fills in the space with dirt. The seeding system 30 is configured to create a plurality of the holes 40 in series, the holes 40 being discrete from each other. The discrete holes 40 are in contrast with other planters configured to create trenches. The seeding system 30 includes a planting assembly 42, a driving assembly 46, and a support assembly 50.

In the illustrated implementation, the row unit 18 includes a single seeding system 30. However, in some cases it may be desirable to include a second seeding system 30 on some or all of the row units 18. The second seeding system 30 would be mounted to the central frame member 26 in line with the first seeding system 30 (e.g., such that both seeding systems 30 are configured to plant a single row). The second seeding system 30 may include its own driving assembly 46 or may be connected to all or part of the driving assembly 46 of the first seeding system 30. In yet other implementations, each row unit 18 may include three or more seeding systems 30.

As best illustrated in FIGS. 7-10, the planting assembly 42 includes a seed guide 54 and a spike 58. The seed guide 54 is formed as a hollow tube 62 having a guide first end 66 and guide second end 70 (FIG. 3). The guide first end 66 is selectively disposed adjacent the ground G and the guide second end 70 is connected to the driving assembly 46. The hollow tube 62 includes a tube wall 74 having a seed aperture 78 disposed between the guide first end 66 and the guide second end 70. The seed aperture 78 may include a through-hole 82 disposed in the tube wall 74. The seed guide 54 includes a guide channel 86 extending through the hollow tube 62. The guide channel 86 may be formed as a through-hole defined by the tube wall 74. The spike 58 is formed as a shaft 90 (such that the terms "spike" and "shaft" may be used interchangeably herein) with a sidewall 92 extending between a spike first end 94 and a spike second end 98 (FIG. 3). The sidewall 92 is elongated and extends parallel to reciprocating movement of the spike 58. The spike first end 94 is tapered to a point 102 such that when inserted into the ground G, the first end creates the hole 40 (which may also be referred to herein as a discrete hole 40), which may be tapered. The hole 40 may be a blind hole (such as a bore or a space or a pocket) in the ground G for receiving one of the seeds S. The spike second end 98 is coupled to the driving assembly 46, as will be described in greater detail below.

The spike 58 is slidably disposed within seed guide 54, such that the guide channel 86 receives the shaft 90. The spike 58 and seed guide 54 are both moveable independently with respect to the central frame member 26. The spike 58 is movable along a stroke path with respect to the seed guide 54. The spike 58 and the seed guide 54 are coaxial. In a first position (FIG. 7) along the stroke path, the spike first end 94 extends lower than the guide first end 66. In the first position, the seed aperture 78 is blocked by the spike 58 such that the seed aperture 78 is not in fluid communication with the guide channel 86 of the seed guide 54. In a second position (FIG. 9) along the stroke path, the spike first end 94 is disposed above the seed aperture 78 of the seed guide 54. In the second position, the seed aperture 78 is open (not blocked by the spike 58) such that the seed aperture 78 is in fluid communication with the guide channel 86 of the seed guide 54 (and ultimately in fluid communication with the hole 40 in the ground G). The spike 58 is movable through the stroke path with respect to the seed guide 54 from the first position to the second position and back to the first position, and so on, in a reciprocating fashion as illustrated in FIGS. 7-10. The stroke path may also include, in addition to the reciprocating component towards and away from the ground G, a rocking or tiling component, which will be described in greater detail below. (The terms "tilting" and "rocking" may be used interchangeably herein.) However, in some implementations, the stroke path may include only the reciprocating component.

The seed tube 170 and the seed guide 54 define the flow path that transports the seed S to the hole 40. The seeding system 30 is configured to retain the seed S outside of the stroke path of the spike 58 until the spike 58 retracts a predetermined distance. The predetermined distance may be met when the spike 58 retracts past the seed aperture 78. In some implementations, the predetermined distance may be met by other distances when the spike 58 retracts to other points along the stroke path.

With reference to FIG. 2, the driving assembly 46 includes a motor 106, a first crankshaft 110, and a second crankshaft 114. The second crankshaft 114 is operably connected to the first crankshaft 110 by a timing belt 118. The motor 106 may be directly coupled to the first crankshaft 110 or the second crankshaft 114 with the other driven by the timing belt 118. In some implementations, the first crankshaft 110 and second crankshaft 114 may extend the length of a single row unit 18 and drive one planting assembly 42. In other implementations, the first crankshaft 110 and second crankshaft 114 may extend across multiple row units 18 and drive multiple planting assemblies 42. The first crankshaft 110 is coupled to a first radial link 122 having a first length R1. In the illustrated implementation, the radial link 122 may include an arm mounted on the first crankshaft 110. In other implementations, the radial link 122 may include a post (not shown) mounted at a radius of R1 to a disc (not shown) mounted on the first crankshaft 110. Other linkages are also contemplated. The first radial link 122 is pivotally coupled to a first rigid link 134. The first rigid link 134 may be formed in a shape designed to avoid interference with other components of the row unit 18, as illustrated, or may be formed as a straight bar in other implementations. The first rigid link 134 is rotatably coupled to the spike second end 98 of the planting assembly 42. Similarly, the second crankshaft 114 is coupled to a second radial link 138 having a second length R2 which is pivotally coupled to a second rigid link 142. The second rigid link 142 is coupled to the guide second end 70 of the seed guide 54 of the planting assembly 42 such that the seed guide 54 is aligned coaxially with the second rigid link 142. In some implementations the seed guide 54 may be formed as a part of the second rigid link 142. In other implementations, the driving assembly 46 may have other configurations for driving the spike 58 and the seed guide 54, such as other arrangements of linkages coupled to a rotating shaft or shafts, or linear actuators (such as electric, pneumatic, or hydraulic linear actuators) may be employed. Other suitable mechanisms for driving the spike 58 and seed guide 54 are also contemplated.

The support assembly 50 supports the planting assembly 42 adjacent the ground G. The planting assembly 42 is supported by the support assembly 50 such that the stroke path of the spike 58 is oriented such that the spike 58 reciprocates extending towards and retracting away from the ground G and the sidewall 92 extends parallel to the reciprocation direction of the spike 58. The support assembly 50 includes a flexible arm 146 extending generally vertically below the central frame member 26 and a support arm 150 coupled to a lower end of the flexible arm 146 and extending generally horizontally towards the planting assembly 42. (The term "generally" is used herein to encompass the ability to pivot, move, and/or flex from the main orientation as described below and to indicate that the main orientation need not be exact, just approximate.) The support arm 150 is coupled to the seed guide 54 of the planting assembly 42 and provides support to the planting assembly 42 and driving assembly 46 to inhibit undesired horizontal motion. The support arm 150 supports the seed guide 54 such that the seed guide 54 may reciprocate independently from the spike 58. The horizontal support arm 150 may be spring biased toward an intermediate position but may be able to extend or retract to allow the planting assembly 42 to deflect horizontally. The flexible arm 146 is formed from a material, such as a metal (such as steel, aluminum, or other metal), polymer, or composite (such as fiberglass), that is elastic enough to bend when a force is applied and resilient enough to return to the original form when the force is released. In other implementations, the support assembly 50 may include a single rigid bar coupling the seed guide 54 to the center frame member 26. In other implementations, the seed guide 54 is directly coupled to the central frame member 26 via a pin joint or other pivoting connection. In other implementations, the support assembly 50 may include a rigid vertical support link extending from the central frame member 26 and a horizontal support arm extending between the support link and the seed guide 54. The support assembly 50 may have other suitable configurations in other implementations.

The press wheel 34 includes an outer surface 154 and is configured to apply a downward force to the ground G. The press wheel 34 is supported on the central frame member 26 by a depth control actuator 158. The depth control actuator 158 is actuatable to move the press wheel 34 vertically lower with respect to the central frame member 26 when the depth control actuator 158 is extended or vertically higher with respect to the central frame member 26 when the depth control actuator 158 is retracted. In the illustrated implementation, the press wheel 34 is supported on a linkage 162 that is rotated counterclockwise when the depth control actuator 158 is extended and clockwise when the depth control actuator 158 is retracted. Thus, the press wheel 34 has at least a component of vertical movement in response to actuation of the depth control actuator 158. The rotation of the linkage 162 causes the vertical displacement of the press wheel 34 with respect to the central frame member 26. The depth control actuator 158 may include a gas spring (not shown) controlled by gage wheels (not shown). In other implementations, the depth control actuator 158 may be pneumatically or hydraulically controlled. The press wheel 34 is rotated in response to a friction force between the ground G and the outer surface 154 when the planter 10 is moving. In other implementations, the press wheel 34 may be mounted to the central frame member 26 in other ways.

The central frame member 26 supports the mini hopper 38 adjacent the seeding system 30. The mini hopper 38 is connected to the one or more hoppers 22 and receives seed S therefrom. The central frame member 26 also supports a seed meter 166 such as is known in the art to provide a regulated flow of seeds. The seed meter 166 receives seeds S from the mini hopper 38, separates the seeds S, and supplies metered seeds S to a seed tube 170 (which may also be referred to herein as a seed conduit), one after another in substantially equal sequential intervals. In some implementations, the seed meter 166 may receive seeds S directly from one of the hoppers 22. The seed tube 170 may be pressurized by a pressure source 172 (e.g., a pump or other source of pressurized air) and is in fluid communication with the seed aperture 78 in the seed guide 54 (and thus fluidly connected to the guide channel 86 and to the hole 40 in the ground G). For example, the seed guide 54 may support an end of the seed tube 170 extending at least partially into the seed aperture 78, or the seed tube 170 and the seed guide 54 may be coupled in any other suitable manner, e.g., using a connector between the seed tube 170 and the seed guide 54 in fluid communication with the seed aperture 78. The pressure may be constant or may be timed to match the operation of the driving assembly 46. In other implementations, the seed tube 170 need not be pressurized, e.g., the seed tube 170 may transport the seeds by gravity. In yet other implementations, the seed tube 170 may include a continuous loop belt for transporting the seeds to the seed guide 54. In yet other implementations, the seed tube 170 may include a mechanism to mechanically urge the seeds out of the seed tube 170. The seed tube 170 may form a first portion of a flow path configured to transport the seeds from the seed meter 166 towards the ground G. The seed guide 54 may define a second portion of the flow path, as will be described in greater detail below.

With reference to FIGS. 3-6, in operation, the vehicle 100 is operated to move the planter 10 across the ground G in a first direction 178 and at a planter speed S1. Each seeding system 30 may be started simultaneously or at different times. When started, the motor 106 of the row unit 18 is activated in order to actuate the driving assembly 46. The activation of the motor 106 is separate from the movement of the planter 10. Because of this, a seeding speed S2 of the seeding system 30, as measured by the number of seeds planted per unit time, is independent from the planter speed S1, as measured by the distance traveled per unit time. The activated motor 106 rotates the first crankshaft 110 counterclockwise (as viewed in FIGS. 3-6). As the first crankshaft 110 rotates, the timing belt 118 transfers the motion to the second crankshaft 114, causing the second crankshaft 114 to rotate counterclockwise. The rotation of the first crankshaft 110 and second crankshaft 114 cause the driving assembly 46 to cycle through a plurality of stages. At the start of the cycle, shown in FIG. 3, the first radial link 122 is disposed pointing to the left of the first crankshaft 110 and the second radial link 138 is disposed pointing upward of the second crankshaft 114. The second rigid link 142 extends generally vertically from the second radial link 138 to the seed guide 54, which also is oriented generally vertically. The spike 58 is pivotally connected to the first rigid link 134 such that it follows the orientation of the seed guide 54. The spike 58 is disposed between the first position and the second position relative to the seed guide 54. Both the spike first end 94 and the guide first end 66 are disposed above the ground G. As shown in FIG. 4, the movement of the first crankshaft 110 and second crankshaft 114 rotates the first radial link 122 and second radial link 138, respectively. The first radial link 122 is disposed downward of the first crankshaft 110, moving the first rigid link 134 and the spike 58 down as well. The second radial link 138 is disposed left of the second crankshaft 114, moving the second rigid link 142 and seed guide 54 down and tilting each toward the left (as illustrated in FIG. 4). The spike 58 is now in the first position relative to the seed guide 54. The spike 58 is in the ground G (meaning engaged with and displacing soil to create the hole 40) and the seed guide 54 is adjacent the ground G. The cycle continues to FIG. 5 where the first radial link 122 points right and the second radial link 138 points down. The seed guide 54 is oriented generally vertically, and the spike 58 is disposed between the first and second positions. The seed guide 54 is now in the ground G, further displacing soil to create the hole 40. In other words, the seed guide 54 is configured to penetrate the ground G to create a portion of the hole 40. The rotation continues to the stage shown in FIG. 6 and the first radial link 122 points upward and the second radial link 138 point left. The seed guide 54 and spike 58 are tilted to the right and the spike 58 is in the second position. The seed guide 54 is adjacent the ground G. The cycle then continues with the first radial link 122 returning to the left of the first crankshaft 110 and the second radial link 138 returning to the top of the second crankshaft 114 as shown in FIG. 3. The resultant motion of the planting assembly 42 in response to the driving assembly 46 is that the seed guide 54 and the spike 58 reciprocate independently with respect to each other and with respect to the central frame member 26. In other words, the seed guide 54 is configured to reciprocate asynchronously with respect to the spike 58. In some portions of the resultant motion, the spike 58 retracts while the seed guide 54 extends (FIG. 8) and in other portions of the resultant motion, the spike 58 extends while the seed guide 54 retracts (FIG. 10).

The movement of the planting assembly 42 is shown in more detail in FIGS. 7-10. As the planter 10 travels along the row in the first direction 178 and the driving assembly 46 operates the spike 58 and seed guide 54 both move toward the ground G, as shown in FIG. 7. As the spike 58 pierces the ground G, the tapered point 102 displaces the soil with minimal force. The spike 58 is tilted away from the first direction 178 as it pierces the ground G, meaning the spike first end 94 is further in the first direction 178 than the spike second end 98. At this time a seed S from the mini hopper 38 has been supplied to the seed tube 170 by the seed meter 166 and travels down toward the planting assembly 42. As shown in FIG. 8, once the spike 58 has reached a maximum extension, it begins to move back toward the central frame member 26, leaving the hole 40 in the ground G. The maximum extension is determined by the length R1 of the first radial link 122. A larger length R1 creates a maximum extension that extends deeper into the ground G. The spike 58 is still tilted away from the first direction 178 as it travels out of the ground G. The seed guide 54 continues to move downward toward a maximum extension and into the ground G, displacing the soil further, still with minimal force required. The maximum extension of the seed guide 54 is determined by the length R2 of the second radial link 138, in a similar manner to the maximum extension of the spike 58. In other words, the maximum extension of the seed guide 54 defines an extended position for engaging the ground G.

At this point, the seed S is disposed adjacent the seed aperture 78 and is inhibited from entering the guide channel 86 by the sidewall 92 of the spike 58, the sidewall 92 acting as a barrier between the seed S and the hole 40. As shown in FIG. 9, the spike 58 retracts, e.g., follows the stroke path away from the ground G. As the spike 58 retracts past the seed aperture 78, gravity and the pressure from the seed tube 170 pushes the seed S into the guide channel 86 of the seed guide 54. In some implementations, gravity may push the seed S into the guide channel 86 without the use of pressure. The spike 58 and the seed guide 54 are configured such that the seed S is blown past the spike 58 upon retraction of the spike 58 past the seed aperture 78. The seed aperture 78 is disposed outside of the stroke path of the spike 58 as the seed aperture 78 is disposed in the tube wall 74 of the seed guide 54. In other words, the spike 58 does not enter the seed aperture 78. The point 102 of the spike 58 is configured to not contact the seed S during shaft extension. However, the sidewall 92 may contact the seed S to block the seed S, as described above, in some instances. The spike 58 is configured to not push the seed S into the ground G. In some implementations, the spike 58 does not include a channel for transporting the seed S through the spike 58; rather, the seed S is transported past the spike 58. Damage to the seed S in inhibited by reducing contact between the spike 58 and the seed S.

As shown in FIG. 10, the seed guide 54 has begun to move back toward the central frame member 26, tilted toward the first direction 178, having widened the hole 40, however the guide first end 66 is still in the ground G. The seed S, therefore, has followed the guide channel 86 down into the hole 40. Misplacement and damage of the seed S is inhibited by injecting the seed S when the guide first end 66 is still in the ground G. As shown in FIG. 10, as the seed guide 54 moves toward the central frame member 26, away from the ground G, the spike 58 begins to move back toward the ground G, and the planting assembly 42 begins to tilt away from the first direction 178 once more. Because of the tilting of the planting assembly 42, the resultant hole 40 is minimally elongated in the first direction 178.

The process repeats to create further holes 40 in series in the first direction 178. The planting assembly 30 is configured to create one hole 40 on each stroke.

The press wheel 34 (FIG. 2) follows the planting unit and applies a force that redistributes the soil, filling in the holes 40. The operation leaves a series of loose soil spots, in contrast to the loose trenches created by typical furrow disks. The press wheel 34 may be supported at different distances from the central frame member 26 in order to create different planting heights. The position of the press wheel 34 may be adjusted by actuating the depth control actuator 158 through the associated gage wheels. Extending the depth control actuator 158 lowers the press wheel 34 toward the ground G, creating a shallower planting depth, and retracting the depth control actuator 158 raises the press wheel 34 away from the ground G, creating a deeper planting depth.

In certain cases, the ground G is not uniform. For example, there may be rocks or hard spots embedded in the ground G. As the spike 58 punches into the ground G, it may run into the hard spot. To inhibit damage to the seeding system 30 and to reduce disruptions to the operation, the force of the rock R is deflected through the flexible arm 146. As illustrated in FIGS. 11-14, when the spike 58 hits a hard spot, the flexible arm 146 may bend allowing the downward force provided by the driving assembly 46 to continue and the planting assembly 42 to move. In the illustrated implementation the flexible arm 146 bends such that a lower end of the flexible arm 146 moves away from the first direction 178 and the planting assembly 42 is horizontally displaced away from the first direction 178. However, the flexible arm 146 and the planting assembly 42 may also deflect toward the first direction 178. The direction of deflection of the flexible arm 146 and the planting assembly 42 may be based on the geometry of the hard spot and the reaction forces within the planting assembly 42.

The planter design as described above requires less down force than typical furrowing discs. Because the planter 10 has to support less down force, the central frame member 26 can be made of lighter materials. The seeding system 30 design also makes it easy to synchronize the seeding across the rows, making it easy to create a grid planted field. The holes created by the seeding system 30 are relatively small and therefore create less loose soil which makes erosion and subsequent seed loss less likely. Additionally, the driving assembly 46 is driven independently of the motion of the planter 10. This allows seeding speed S2 to be varied independently of the planter speed S1, allowing for more precise seeding. The small profile of the seeding system 30 and the holes created by the seeding system 30 allows for less distance between row units 18 and therefore less distance between rows. Thus, more rows can be planted.

The planter 10 is operable to simultaneously plant seeds of two or more different plant genotypes in a single planting operation, or in a single pass of the planter 10 through a field. Specifically, the hoppers 22 may each be filled with different seeds of different plant genotypes. Seeds of different plant "genotypes" can include without limitation seeds of different plant varieties, of different plant cultivars, of different plant hybrids, or of different plant species. The different seeds may be distributed to different row units 18 of the planter 10, or to different seeding systems 30 of a single row unit 18, or different seeds may be selectively supplied to a single seeding system 30, as will be further described below. As such, the planter 10 can be utilized to practice intercropping, a multiple cropping practice where two or more crops are grown in proximity. Intercrops may include a first crop, or cash crop, of a first plant type to be harvested, and may further include one or more cover crops of different plant types that are planted between rows of the cash crop. The one or more cover crops can be selected to manage attributes of the soil, such as soil erosion, soil fertility, soil quality, water, weeds, pests, diseases, biodiversity, wildlife, and other attributes.

The following description will focus on systems and methods of intercropping, or planting seeds of at least two plant genotypes in a field, using a multi-variety planter such as the planter 10 described above. While the planter 10 is one example of a multi-variety planter by which the following systems and methods of intercropping may be realized, other types of multi-variety planters can likewise be utilized. Implementation of the following disclosure should not be limited to the planter 10 described above in connection with FIGS. 1-14.

Figure 15:
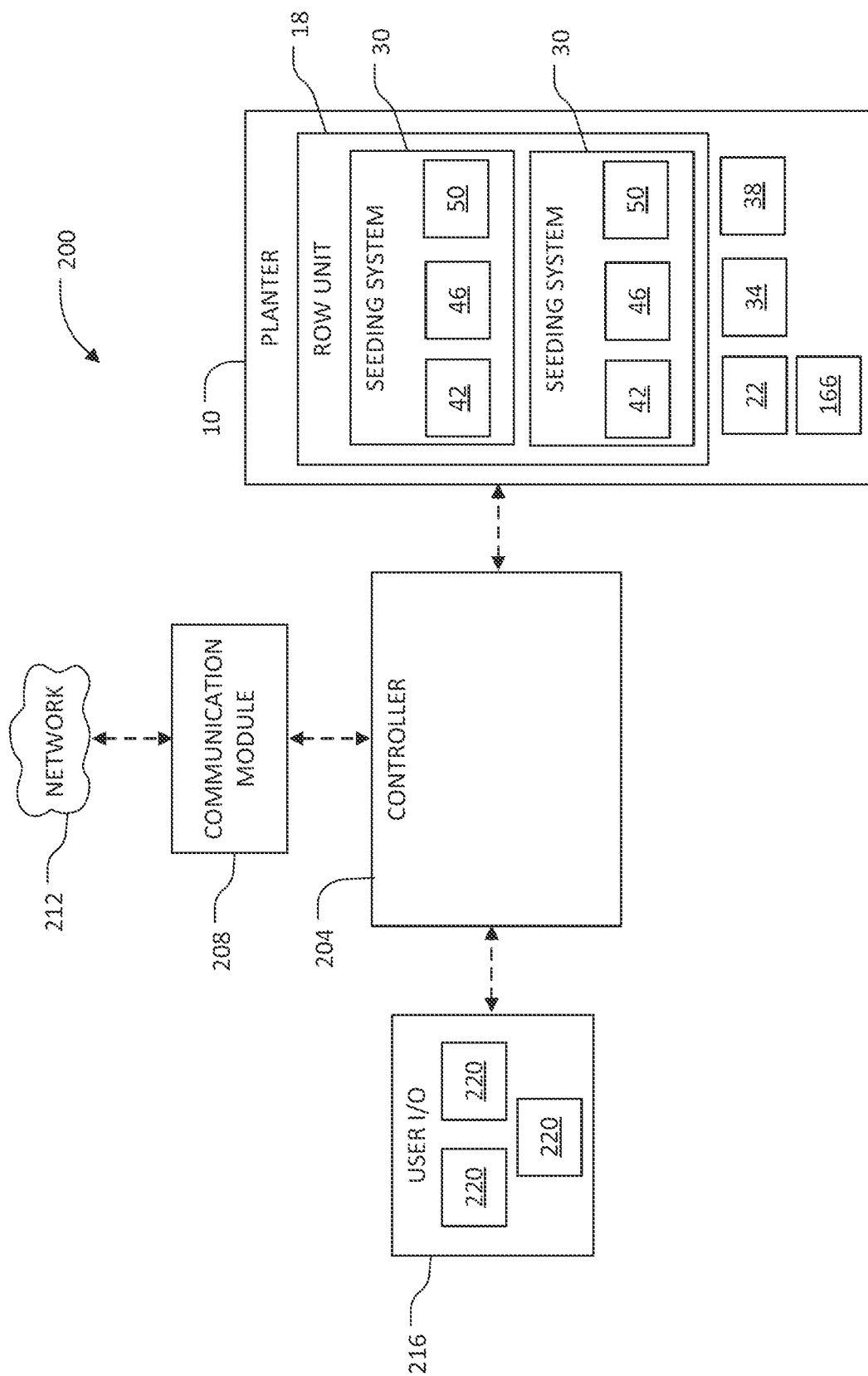
FIG. 15 is a schematic view of a control system for the planter of FIG. 1.

FIG. 15 illustrates a control system 200 for a multi-variety planter such as the planter 10 described above. The illustrated control system 200 is configured to control operation of one or more components of the planter 10, including, e.g., the plurality of row units 18, the hoppers 22, the downforce control actuators, the seeding systems 30, the press wheel 34, the mini hopper 38, the planting assembly 42, the driving assembly 46, the depth control actuator 50, the seed meters 166, and other components. The control system 200 includes a controller 204 with a plurality of inputs and outputs that are operable to receive and transmit information and commands to and from different components in the planter 10. The controller 204 can be located onboard the planter 10, onboard the vehicle 100, or located remotely therefrom. Communication between the controller 204 and the different components can be accomplished through, e.g., a CAN bus, another communication link (e.g., wireless transceivers), or through a direct connection. The control system 200 also includes a communication module 208 configured to connect to and communicate with other devices (e.g., a local computer, a remote server, another multi-variety planter, etc.) through a network 212. The network 212 can be, for example, a wide area network ("WAN") (e.g., a global positioning system ("GPS"), a TCP/IP based network, a cellular network, etc.).

The control system 200 further includes a user input/output module 216 that includes one or more operator input mechanisms 220 in communication with the controller 204. The one or more operator input mechanisms 220 can include, for example, a joystick, throttle control mechanism, pedal, lever, switch, keyboard, mouse, button, voice recognition system, or other control mechanism. The operator input mechanisms 220 may be located locally (e.g., within the vehicle 100), or at a location remote from the planter 10 and can be used to control the operation of the planter 10 via input signals to the controller 204. The user input/output module 216 can also include one or more output mechanisms (e.g., a display, a speaker, or a haptic actuator) or input/output mechanisms (e.g., a touch screen display device).

The controller 204 includes memory for storing software, logic, algorithms, programs, a set of instructions, etc. for controlling the planter 10 including the plurality of row units 18, the hoppers 22, the downforce control actuators, the seeding systems 30, the press wheel 34, the mini hopper 38, the planting assembly 42, the driving assembly 46, the depth control actuator 50, the seed meters 166, and other components described above. The controller 204 also includes a processor for carrying out or executing the software, logic, algorithms, programs, set of instructions, etc. stored in the memory. The memory can store look-up tables, graphical representations of various functions, and other data or information for carrying out or executing the software, logic, algorithms, programs, set of instructions, etc. The controller 204 can receive (e.g., via the communication module 208) georeferenced field information pertaining to a field to be planted, and plant information pertaining to existing crops or other plants in the field, one or more cash crops to be planted, one or more cover crops to be planted.

Figure 16:
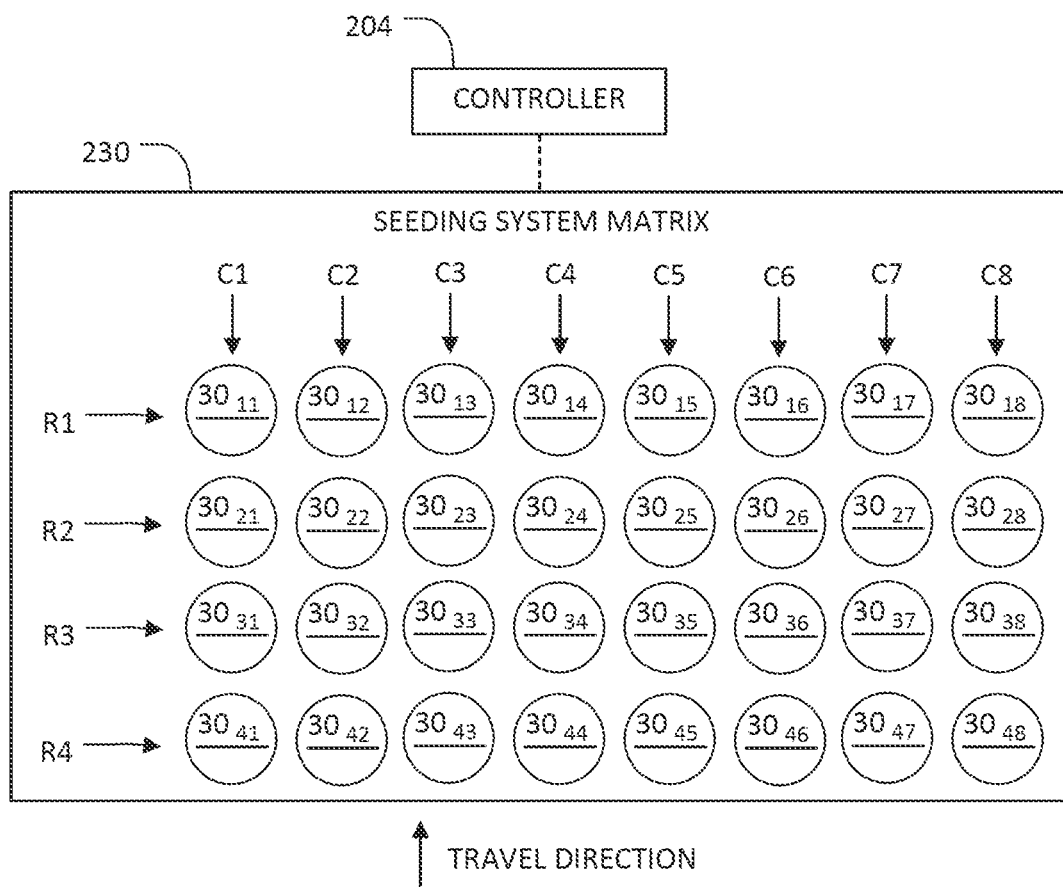
FIG. 16 is a schematic view of a seeding system matrix that includes a plurality of seeding systems of the planter of FIG. 1.

FIG. 16 schematically illustrates an embodiment of a seeding system matrix 230 of the planter 10. The seeding system matrix 230 includes multiple seeding systems 30 arranged in a plurality of ranks $R_1, R_2, \ldots R_n$ and a plurality of columns $C_1, C_2, \ldots C_m$. In some embodiments, the seeding system matrix 230 may span across multiple row units 18 of the planter 10, while in other embodiments all of the seeding systems 30 of the seeding system matrix 230 can be located on a single row unit 18. As the planter 10 moves along a path in a field to perform a planting operation, the ranks $R_1, R_2, \ldots R_n$ extend transverse to the path and the columns $C_1, C_2, \ldots C_m$ extend parallel to the path.

The illustrated seeding system matrix 230 includes four ranks $R_1$-$R_4$ and eight columns $C_1$-$C_8$ for a total of thirty two seeding systems 30, although the number of ranks and columns may vary in other examples. It should be understood that the seeding system matrix 230 may include fewer or more ranks R (e.g., one rank, two ranks, or more than two ranks) and fewer or more columns C (e.g., one column, two columns, or more than two columns) and still perform the methods described herein. Each seeding system 30 within the seeding system matrix 230 of FIG. 16 is identified numerically by its corresponding rank R and column C, and may be referred to individually as seeding system $30_{RC}$. For example, the first rank $R_1$ includes, from left to right, seeding system $30_{11}$, seeding system $30_{12}$, ... seeding system $30_{18}$, and the first column $C_1$ includes, from top to bottom, seeding system $30_{11}$, seeding system $30_{21}$, ... seeding system $30_{41}$.

Each seeding system 30 of the seeding system matrix 230 can receive seeds S from the one or more hoppers 22 (FIG. 1) via the seed meter 166. An individual seeding system $30_{RC}$ can be capable of receiving and planting seeds S of two or more different genotypes. The seeds of different genotypes can be supplied from two or more different hoppers of the hoppers 22. In some examples, the seeding systems 30 located within the same rank R can all receive and plant seeds S of the same genotype. In other examples, two or more seeding systems 30 of the same rank R can receive and plant different seeds S of different genotypes. Likewise, in some embodiments, the seeding systems 30 located within the same column C can all receive and plant seeds S of the same genotype, while in other examples, two or more seeding systems 30 of the same column C can receive and plant different seeds S of different genotypes.

Figure 17:
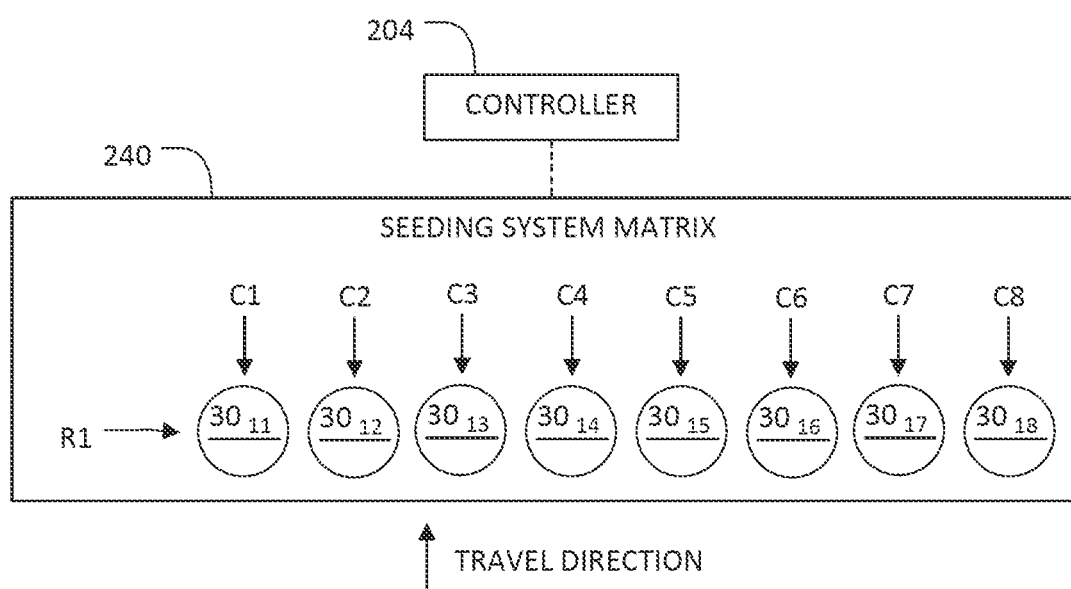
FIG. 17 is a schematic view of a seeding system matrix that includes a plurality of seeding systems of the planter of FIG. 1, according to another embodiment.

In another embodiment, the planter 10 can include an alternative seeding system matrix 240 having seeding systems 30 provided in a single rank R and multiple columns C, as shown in FIG. 17. The outermost seeding systems 30, i.e., the seeding system $30_{11}$ located in the first column $C_1$ and the seeding system $30_{18}$ located in the last column $C_8$, can be separated by a distance D representing a standard row spacing for rows of the primary or cash crop. For example, the outermost seeding systems $30_{11}$, $30_{18}$ can be separated by a distance D of 60 inches and can be utilized to plant corn in parallel rows with 60 inch spacing. The remaining seeding systems $30_{12}$-$30_{17}$ of the seeding system matrix 240 can receive different seeds of different genotypes, and can be operated to plant one or more cover crops or one or more additional cash crops between the rows of the first cash crop in the field. Moreover, the seeding system matrix 240 can plant two rows of the cash crop with the outermost seeding systems $30_{11}$, $30_{18}$ and the one or more cover crops with the interior seeding systems $30_{12}$-$30_{17}$ simultaneously, in a single pass of the planter 10 through the field. The planter 10 can comprise two or more seeding system matrices 240 to increase the area of the field planted or the number of rows planted per pass through the field. In some embodiments (not shown), the seeding system matrix 240 can include some of the seeding systems 30 described above (i.e., creating discrete holes 40 into which the seed is guided), and may also include one or more traditional seeding systems that create seed trenches in the ground to receive the seeds. In such embodiments, the outermost seeding units can be traditional, trenching seeding units for planting rows of the cash crop, while the interior seeding units 30 can plant seeds of the one or more cover crops into discrete holes in the ground.

The seeding unit matrices 230, 240 described above can plant intercrops with high resolution of seed planting locations for multiple plant genotypes. In some examples, up to sixteen or more crop varieties can be planted in the intercrop with parameters like plant pattern, seed spacing, and seed depth individually controlled. The seeding unit matrices 230, 240 utilizing the seeding systems 30 described above can effectively adjust the planting depth for seeds of different plant genotypes (e.g., via the depth control actuator 158 described above). In contrast, traditional trench planters cannot effectively vary planting depth for seeds of different plant genotypes, since the trench into which the seeds are planted can only be formed at one depth. The planting rate and spacing can also be varied by, for example, providing more ranks R in the seeding unit matrices 230, 240, or by varying the speed of motor 106 relative to the speed at which the planter 10 travels across the field. Moreover, seeds can be planted into fields having existing ambient plant material (living or dead) with minimal disturbance.

When planting an intercrop comprising two or more cover crops interplanted in the field, seed ratios of the cover crops may be varied across different regions of the field to provide a larger population of one of the cover crop plant genotypes where a field deficiency is being addressed or where a plant strength is being leveraged. For example, of one, two, or more than two of the cover crops in the intercrop can be favored or planted at a higher seed ratios in a selected region of the field based on attributes of their respective genotypes to: (1) control weeds by aggressively taking resources from weeds; (2) improve trafficability by capturing soil moisture or improving soil structure; (3) reduce compaction by roots that perform living tillage; and (4) reduce pests due to allelopathic plant properties or refuge management.

The following description provides examples of interplanting cover crops in the space between rows of adjacent cash crops (e.g., corn) in a field. The examples are described in connection with FIGS. 18-21, which illustrate repeatable planting patterns for planting seeds of two or more different genotypes into the space between the rows. The examples utilize various combinations of plants of different genotypes including red clover (RC) to provide deep tillage, tillage radish (TR) to provide shallow or surface tillage, hairy vetch (HV) to provide soil building, and rye (RY) to provide weed control by establishing quickly after planting. The planting patterns include seeds of two or more of the different genotypes RC, TR, HV, and RY arranged in parallel rows 244 and ranks 248. The rows 244 extend in a repeat direction or the direction of travel of the planter 10 through the field, corresponding to the direction of rows planted in the field and the path travelled by the planter 10. FIGS. 18-21 show the seeding pattern for rows 244 and ranks 248 with uniform spacing. In some examples, the interplant spacing along rows 244 may be variable as a function of plant genotype, target population, or other factors. If seeding units 30 can be moved transverse to the direction of planter travel, then the inter-seed spacing along ranks 248 may also be variable. In some examples, discrete variable rank spacing may be achieved with fixed seeding units by not planting a seed in a given location. Parameters such as seed genotype, seed spacing, and seed depth may be controlled down to per-plant resolution, resulting in a precise planting pattern.

Each of the seeding system matrices 230, 240 can be utilized to interplant the cover crops according to the planting patterns shown in FIGS. 18-21. For example, the planter 10 can include the seeding unit matrix 230, with the seeding systems $30_{11}$-$30_{18}$ of rank $R_1$ controlled to plant red clover (RC), the seeding systems $30_{21}$-$30_{28}$ of rank $R_2$ controlled to plant tillage radish (TR), the seeding systems $30_{31}$-$30_{38}$ of rank $R_3$ controlled to plant hairy vetch (HV), and the seeding systems $30_{41}$-$30_{48}$ of rank $R_4$ controlled to plant rye (RY). Thus configured, each column C of the seeding unit matrix includes a seeding unit 30 capable of planting each of the four seed genotypes, and seeds of any of the four seed genotypes can be planted in any given row 244 according to the planting patterns. Alternatively, the planter 10 can include the seeding unit matrix 240, with each seeding unit $30_{11}$-$30_{18}$ controlled to selectively plant any of the four seed genotypes RC, TR, HV, and RY. Equipped with either of the seeding system matrices 230, 240, the planter 10 can travel through the field along the direction of the rows 244 to plant the intercrop with the seeds positioned according to the planting patterns.

Example 1

Site-Specific Tillage

Figure 18:
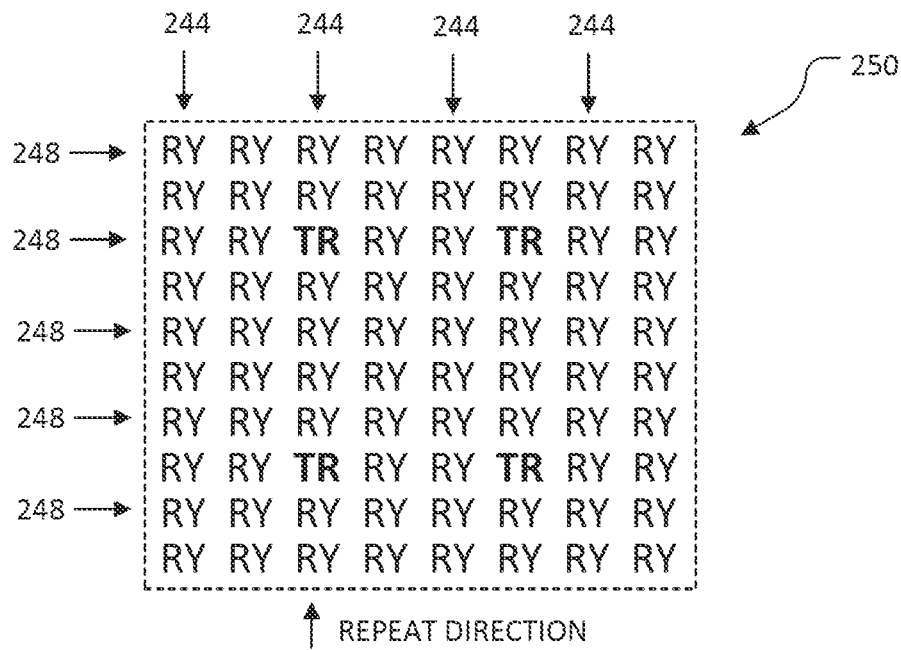
FIGS. 18-21 are schematic views of planting patterns for planting seeds of two or more different genotypes in a field.

FIG. 18 illustrates a repeatable first planting pattern 250 according to which seeds of rye (RY) and seeds of tillage radish (TR) can be planted at the illustrated relative locations seed ratios within the space between the rows of the cash crop. The first planting pattern 250 can be a baseline planting pattern suitable for "normal" regions of the field, i.e., all regions that do not exhibit unique strengths or needs. The rye (RY) is leveraged for weed control, while a relatively small number of seeds of tillage radish (TR) are interspersed among the rye seeds to provide some shallow tillage. The first planting pattern 250 includes a high ratio of RY:TR, which in the illustrated example is 19:1.

Figure 19:
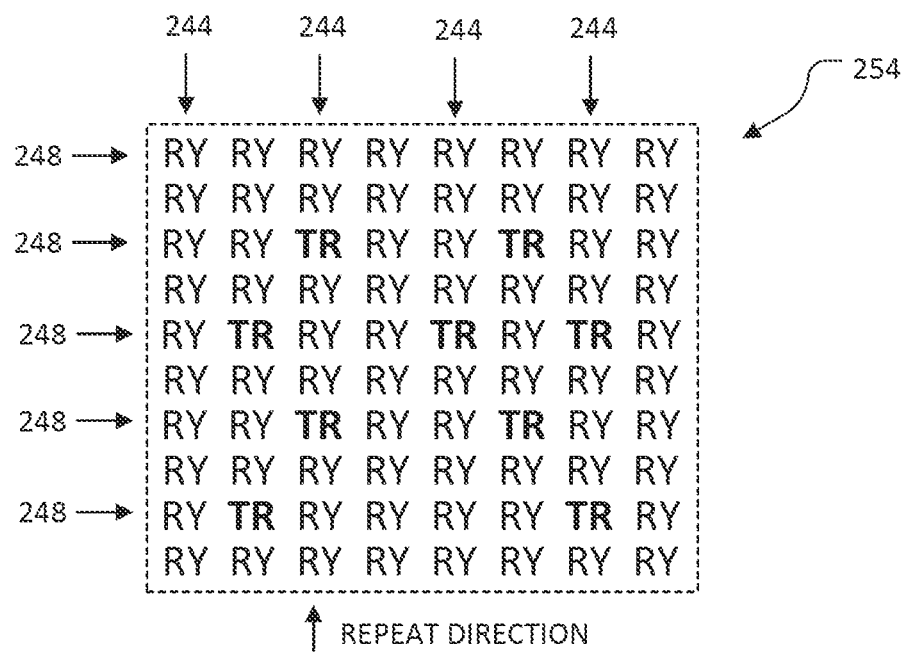

FIG. 19 illustrates a repeatable second planting pattern 254 in which the ratio of RY:TR is lower than the first planting pattern 250. Specifically, in the second planting pattern 254 the ratio of RY:TR is 71:9, yielding a relatively larger population of tillage radish (TR) in the intercrop. The second planting pattern 254 may be suitable for regions of the field having shallow soil compaction.

Figure 20:
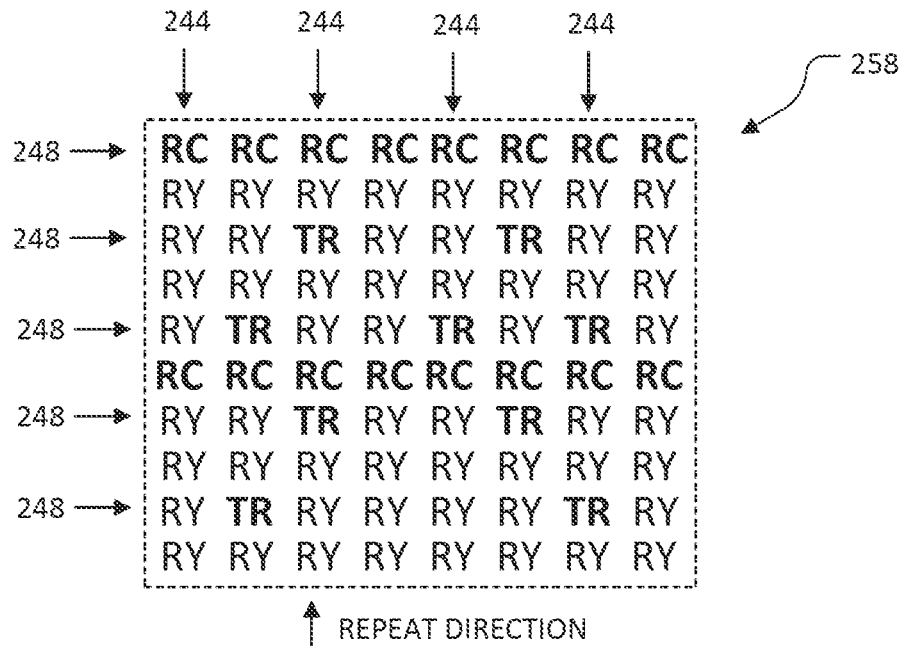

FIG. 20 illustrates a repeatable third planting pattern 258 that includes rye (RY), tillage radish (TR), and red clover (RC). The tillage radish (TR) are distributed among the rye (RY) in a manner similar to the second planting pattern 254, and the RC occupy the entirety of every fifth rank of the pattern. The third planting pattern 258 includes a seed ratio of RY:TR:RC of 55:9:16. The third planting pattern 258 may be suitable for regions of the field having shallow and deep soil compaction.

Example 2

Soil Building

Figure 21:
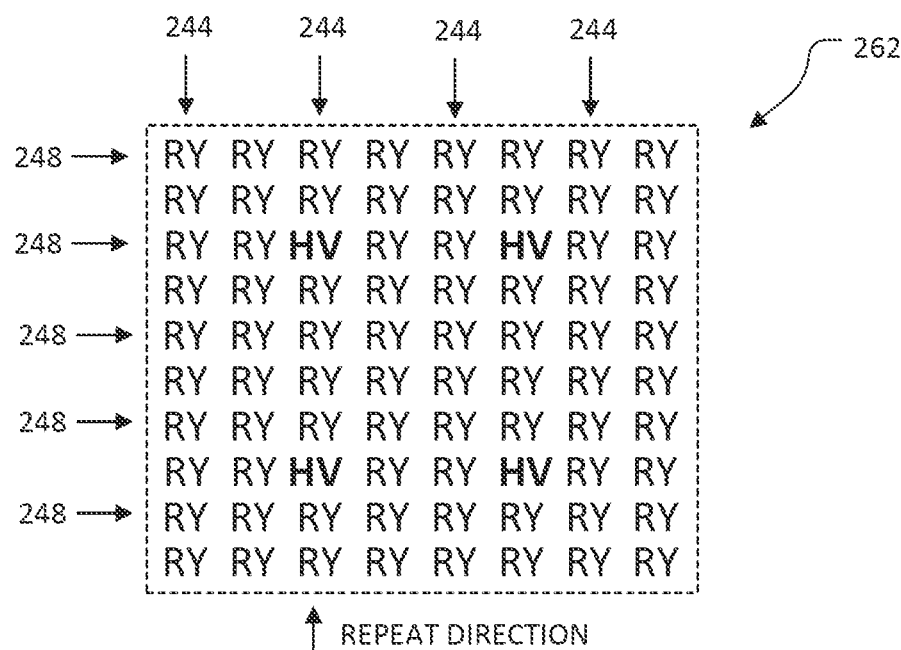

FIG. 21 illustrates a repeatable fourth planting pattern 262 according to which seeds of rye (RY) and seeds of hairy vetch (HV) can be planted at the illustrated relative locations and seed ratios within the space between the rows of the cash crop. The rye (RY) is leveraged for weed control, while a relatively small number of seeds of hairy vetch (HV) are interspersed among the rye (RY) seeds to provide some soil building, including nitrogen fixation. The fourth planting pattern 262 includes a high ratio of RY:HV, which in the illustrated example is 19:1. If some regions of the field have relatively greater nitrogen needs, the fourth planting pattern 262 can be adapted to include relatively more hairy vetch (HV) seeds such that the ratio of RY:HV is reduced. Soil building needs for each region of the field may be determined, e.g., by soil testing or from a vegetative index map in preparation for planting in the spring. In other examples, a normalized difference vegetation index (NDVI) map from the current growing season may be used to guide post-harvest hairy vetch (HV) planting density to build up nitrogen for the following year.

Example 3

Weed Control

As noted earlier, rye (RY) is effective for weed control by growing quickly and blocking out weeds. Given the amount of rye (RY) in the planting pattern 250 from Example 1 above, this might be an example of a planting pattern focused on weed control. Based on a weed seed map from a prior growing period, weed densities at a future time may be predicted. Rye (RY) seeding densities of one or more planting patterns for one or more regions of the field may be a function of estimated weed seed densities. The rye (RY) density may also consider weed species, weed herbicide resistance, weed control effectiveness of other available intercrop species (e.g., hairy vetch (HV) can also mitigate weeds), and other factors.

Thus in one example, hairy vetch (HV) may be given priority based on soil nitrogen needs in a first region of the field, but in a second region containing herbicide-resistant weed seeds or juvenile plants above a threshold, rye (RY) may be given a priority. In another example, a mathematical function may calculate a rye (RY)/hairy vetch (HV) seeding ratio as a function of weed seed species and densities for a given region. In yet another example, seeding rates for multiple varieties of plants or seeding patterns of multiple varieties may be generated through machine learning techniques trained by datasets comprising results of various treatments in various contexts. These different approaches to generating rates and patterns may be applied to other goals such as those mentioned above.

Figure 22:
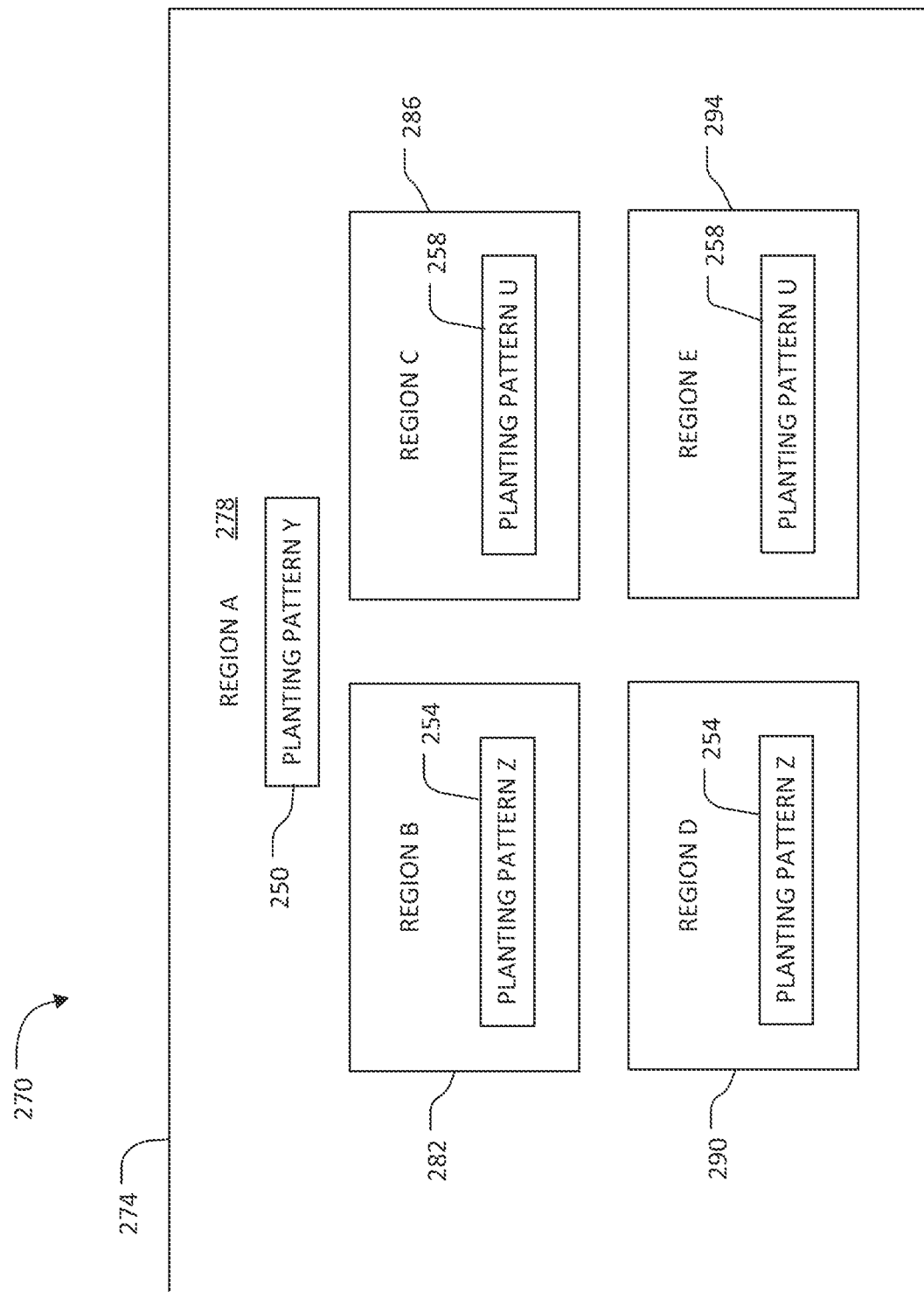
FIG. 22 is a schematic view of a planting map generated by the control system of FIG. 15.

FIG. 22 is a block diagram illustrating a planting map 270 for planting an intercrop in a field 274 using the planter 10. The planting map 270 is generated by the controller 204 based on georeferenced field information and plant information received by the controller 204. The georeferenced field information can include, e.g., a topographic map of the field 274, a soil type map of the field 274, a sensing map of the field 274, or an existing crop map for an existing crop in the field 274. The georeferenced field information can further include crop compatibility information for the plants of the existing crop and for one or more plants of different genotypes that can be interplanted with the existing crop in the field 274. The plant information can be associated with the existing crop, and with the one or more plants that can be interplanted with the existing crop, and can include, e.g., root attributes, water utilization attributes, canopy attributes, environmental response attributes, nutrient generation attributes, soil structure impacts, livestock forage attributes, carbon sequestration attributes, allelopathic attributes, and pest harbor attributes. "Sensing map" refers to a map based on georeferenced sensor data associated with the field. The sensor data may be used directly or may be further processed or combined with other sensor data. In some examples, sensor data may be used in conjunction with crop or soil models to create sensing maps. Sensors for collecting the sensor data may be at a fixed location, attached to a ground vehicle, or attached to an aerial vehicle or satellite. The interval between data collection and planting may be nearly instant or may span longer periods of time. For example, sensing maps may depict sensor data relating to, without limitation: compaction, soil constituents (e.g., nitrogen, phosphorus, potassium, micronutrients, soil organic matter, soil moisture, and the like), weed populations, pest populations, soil carbon or soil organic matter, soil moisture, or other data.

Based on the georeferenced field information and the plant information, the controller 204 generates the planting map 270 by subdividing the field 274 into two or more different regions having different planting needs and assigning a planting pattern to each region. The illustrated planting map 270 shows the field 274 divided into five regions 278, 282, 286, 290, and 294, although fewer or more regions are also possible. Each of the regions 278-294 is assigned a planting pattern according to which plants of different genotypes are to be interplanted in the given region of the field 274 by the planter 10. For example, planting pattern 250 is to be planted in region 278, planting pattern 254 is to be planted in region 282 and in region 290, and planting pattern 258 is to be planted in region 286 and in region 294. Multiple regions of the field 274 can be planted with the same planting pattern as shown in FIG. 22. For example, two instances of planting pattern 254 and two instances of planting pattern 258 are present in the field 274. Areas in between these regions are all part of region 278, which is to be planted according to planting pattern 250. While planting patterns 250, 254, and 258 are contemplated in the example shown in FIG. 22, other planting patterns utilizing different plant genotypes in different ratios and patterns are also possible.

Figure 23:
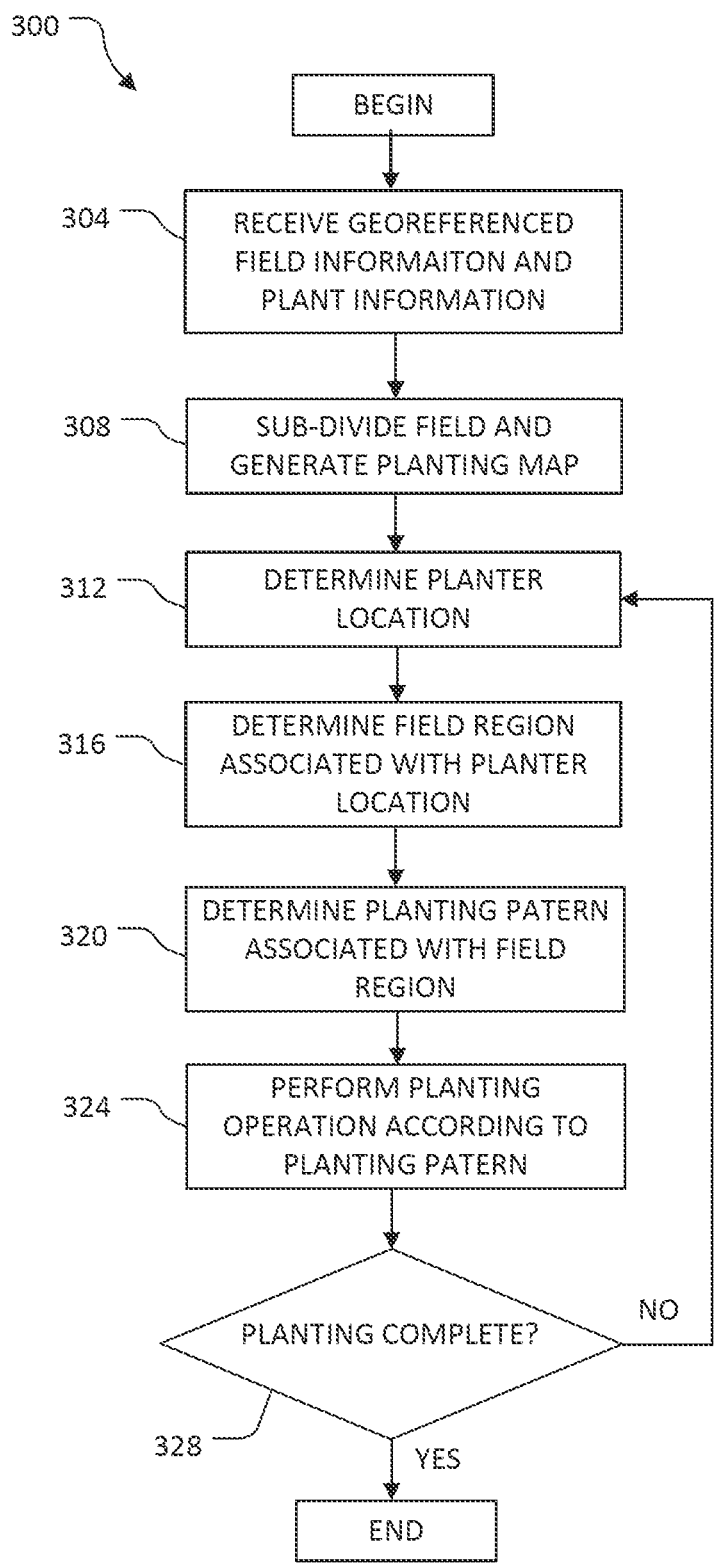
FIG. 23 is a flow chart of a method for performing a multiple variety planting operation using the control system of FIG. 15.

FIG. 23 illustrates an example of a method for performing a multiple variety planting operation using a control system, in accordance with an illustrative embodiment. The control system may be, for example, the control system 200 shown in FIG. 15. The operations of method 300 are described as being carried out by a "system". As used herein, the "system" may be one or more components of the control system 200 shown in FIG. 15, such as, e.g., the controller 204.

Method 300 begins as the system receives georeferenced field information and plant information for the field 274 to be planted via the multi-variety planter 10 (step 304). The georeferenced field information and the plant information may be stored locally (e.g., in the memory of the controller 204), or may be received from the network 212 via the communication module 208. Next, the system generates a planting map, such as the planting map 270, by sub-dividing the field 274 into two or more regions and assigning a planting pattern to each region based on the georeferenced field information and the plant information (step 308). Then, the system determines a current location of the planter 10 (step 312). The system then uses the planting map 270 to determine a region associated with the current location (step 316) and to determine a planting pattern associated with the current region (step 320). The controller then controls the planter 10 to perform a planting operation according to the current planting pattern (step 324).

The system then determines whether the planting operation is complete (step 328). The planting operation is complete when the entire field 274 has been planted according to the planting map 270. If the planting operation is not complete, then the method returns to step 312 and repeats step 312 through step 328. If the region changes, i.e., if by steps 312 and 316 it is determined that the location of the planter 10 has moved into a different field region, then the system determines the planting pattern associated with the new field region (step 320) and performs the planting operation according to the new planting pattern. If, at step 328, the system determines that the planting operation is complete, the process may terminate thereafter.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances or resolutions associated with manufacturing, assembly, and use of the described embodiments and components.

What is claimed is:

1. A field planting system for planting seeds of at least two plant genotypes in a field, the field planting system comprising:
   a multi-variety planter operable to plant the seeds of the at least two plant genotypes in the field; and
   a controller in operable communication with the multi-variety planter, the controller configured to
      receive georeferenced field information for the field and plant information for the at least two plant genotypes,
      generate a planting map for the field based on the georeferenced field information and the plant information, the planting map including a planting pattern for interplanting the seeds of the at least two plant genotypes,
      monitor a location of the multi-variety planter in the field,
      control the multi-variety planter to plant the seeds of the at least two plant genotypes in the field according to the planting map, and
      control the multi-variety planter to vary a planting depth of the seeds of the at least two genotypes by successively planting along a row in the field a first seed at a first depth, a second seed at a second depth, and a third seed at a third depth, the second depth being different than the first depth and the third depth being different than the second depth.

2. The field planting system of claim 1, wherein the first seed is of a first plant genotype of the at least two plant genotypes, the second seed is of a second plant genotype of the at least two plant genotypes, and the third seed is of the first plant genotype.

3. The field planting system of claim 1, wherein the multi-variety planter includes a depth control actuator, and wherein the controller is configured to vary the planting depth of the seeds via the depth control actuator.

4. The field planting system of claim 3, wherein
   the multi-variety planter further includes a press wheel coupled to the depth control actuator, and wherein the depth control actuator is operable to adjust a position of the press wheel relative to a ground surface of the field.

5. The field planting system of claim 1, wherein the georeferenced field information includes at least one of:
a topographic map of the field;
a soil type map of the field;
a sensing map of the field;
an existing crop map for an existing crop in the field; or
crop compatibility information for the existing crop and the at least two different plant genotypes.

6. The field planting system of claim 1 wherein the at least two plant genotypes include at least one of different hybrids or different species.

7. The field planting system of claim 1, wherein the plant information includes at least one of: root attributes; water utilization attributes; canopy attributes; environmental response attributes; nutrient generation attributes; soil structure impacts; livestock forage attributes; carbon sequestration attributes; allelopathic attributes; or pest harbor attributes.

8. The field planting system of claim 1, wherein the multi-variety planter includes a seeding system matrix having at least two seeding systems arranged in at least one rank that extends perpendicular to a direction of travel of the multi-variety planter during planting, wherein each seeding system is configured to plant the seeds of the at least two plant genotypes.

9. A field planting system for planting seeds of a first plant genotype and seeds of a second plant genotype in a field, the field planting system comprising:
a multi-variety planter operable to plant the seeds of the first and second plant genotypes in the field, the multi-variety planter including a press wheel and a depth control actuator operable to adjust a position of the press wheel relative to a ground surface of the field; and
a controller in operable communication with the multi-variety planter, the controller configured to
receive georeferenced field information for the field and plant information for the first and second plant genotypes,
sub-divide the field into a first region and a second region based at least in part on the georeferenced field information,
generate a planting map for the field based on the georeferenced field information and the plant information, the planting map including a first planting pattern for interplanting the seeds of the first and second plant genotypes in the first region, and a second planting pattern for interplanting the seeds of the first and second plant genotypes in the second region, the second planting pattern being different from the first planting pattern,
monitor a location of the multi-variety planter in the field,
control the multi-variety planter to plant the seeds of the first and second plant genotypes in the field according to the planting map, and
control the multi-variety planter to vary a planting depth of the seeds of the first and second plant genotypes via the depth control actuator by successively planting along a row in the field a first seed at a first depth, a second seed at a second depth, and a third seed at a third depth, the second depth being different than the first depth and the third depth being different than the second depth;
wherein the first seed is of the first plant genotype, the second seed is of the second plant genotype, and the third seed is of the first plant genotype.

10. The field planting system of claim 9, wherein:
the planting pattern includes a repeatable pattern of seeds of the first plant genotype and seeds of the second plant genotype arranged into at least two rows that extend parallel to a direction of travel of the multi-variety planter during planting, and at least two ranks; and
at least one of the at least two rows includes at least one seed of the first plant genotype and at least one seed of the second plant genotype.

11. The field planting system of claim 9, wherein the controller is configured to determine whether the location of the multi-variety planter corresponds to one of the first region and the second region, and upon the determination, determine which of the first planting pattern and the second planting pattern is associated with the one of the first region and the second region.

12. The field planting system of claim 9, wherein the controller is configured to further sub-divide the field into a third region, and wherein the planting map further includes a third planting pattern for interplanting the seeds of the first and second plant genotypes in the third region, the third planting pattern being different from the first planting pattern and the second planting pattern.

13. The field planting system of claim 9, wherein the multi-variety planter includes a seeding system matrix having at least two seeding systems arranged in at least one rank that extends perpendicular to a direction of travel of the multi-variety planter during planting, wherein each seeding system is configured to plant the seeds of the first plant genotype and the seeds of the second plant genotype.

14. The field planting system of claim 9, wherein the multi-variety planter includes a seeding system matrix having at least two seeding systems arranged in at least two ranks that extend perpendicular to a direction of travel of the multi-variety planter during planting, wherein at least one of the seeding systems of the at least two seeding systems is configured plant the seeds of the first plant genotype, and at least another of the at least two seeding systems is configured to plant the seeds of the second plant genotype.

15. The field planting system of claim 9, wherein the multi-variety planter is configured to plant the seeds of the first and second plant genotypes in the field when an existing crop also present in the field.

16. A method of planting an intercrop in a field with a multi-variety planter, the multi-variety planter including a press wheel and a depth control actuator operable to adjust a position of the press wheel relative to a ground surface of the field, the method comprising:
receiving georeferenced field information for the field and plant information for a first plant genotype and a second plant genotype;
generating a planting map for the field based on the georeferenced field information and the plant information, the planting map including a planting pattern for interplanting seeds of the first plant genotype and seeds of the second plant genotype in the field;
monitoring a location of the multi-variety planter in the field;
planting the seeds of the first and second plant genotypes in the field via the multi-variety planter and according to the planting map; and
varying a planting depth of the seeds of the first and second plant genotypes via the depth control actuator by successively planting along a row in the field a first seed at a first depth, a second seed at a second depth, and a third seed at a third depth, the second depth being different than the first depth and the third depth being different than the second depth;

wherein the first seed is of the first plant genotype, the second seed is of the second plant genotype, and the third seed is of the first plant genotype.

17. The method of claim 16, wherein the multi-variety planter is configured to plant the seeds of the first and second plant genotypes according to the planting pattern in a single pass through the field.

18. The method of claim 16, further comprising:

after receiving the georeferenced field information for the field, sub-dividing the field into a first region and a second region based at least in part on the georeferenced field information, wherein the planting pattern includes a first planting pattern for interplanting the seeds of the first and second plant genotypes in the first region, and a second planting pattern for interplanting the seeds of the first and second plant genotypes in the second region, the first planting pattern being different from the second planting pattern.

19. The method of claim 18, wherein the sub-dividing step further includes subdividing the field into the first region, the second region, and a third region, and wherein the planting pattern further includes a third planting pattern for interplanting the seeds of the first and second plant genotypes in the third region, the third planting pattern being different from the first planting pattern and the second planting pattern.

20. The method of claim 18, wherein after monitoring a location of the multi-variety planter in the field, determining whether the location of the multi-variety planter corresponds to one of the first region and the second region.

* * * * *